United States Patent
Osborne

(10) Patent No.: US 7,843,918 B2
(45) Date of Patent: Nov. 30, 2010

(54) SELECTIVELY FORWARDING TRAFFIC THROUGH TUNNELS IN A COMPUTER NETWORK

(75) Inventor: Eric W. Osborne, Sutton, MA (US)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 12/019,692

(22) Filed: Jan. 25, 2008

(65) Prior Publication Data

US 2009/0190477 A1 Jul. 30, 2009

(51) Int. Cl.
H04L 12/28 (2006.01)
H04L 12/56 (2006.01)

(52) U.S. Cl. .................. 370/389; 370/397; 370/409

(58) Field of Classification Search .................. None
See application file for complete search history.

(56) References Cited

U.S. PATENT DOCUMENTS

| | | | |
|---|---|---|---|
| 6,487,167 B1* | 11/2002 | Shaio ................... | 370/392 |
| 6,665,273 B1* | 12/2003 | Goguen et al. | |
| 6,889,258 B1* | 5/2005 | Liu et al. ................. | 709/245 |
| 7,023,879 B1* | 4/2006 | Sitaraman et al. | |
| 7,123,587 B1* | 10/2006 | Hass et al. ............... | 370/238 |
| 7,180,899 B2* | 2/2007 | De Silva et al. | |
| 7,225,270 B2* | 5/2007 | Barr et al. | |
| 7,281,036 B1* | 10/2007 | Lu et al. | |
| 7,284,053 B1* | 10/2007 | O'Rourke et al. | |
| 7,289,429 B2* | 10/2007 | Mo et al. ................. | 370/217 |
| 7,433,349 B2* | 10/2008 | Liu et al. ................. | 370/351 |
| 7,463,593 B2* | 12/2008 | Pohlabel et al. ......... | 370/252 |
| 7,577,143 B1* | 8/2009 | Kompella ................ | 370/392 |
| 2004/0148520 A1* | 7/2004 | Talpade et al. .......... | 713/201 |
| 2005/0063352 A1* | 3/2005 | Amara et al. ............ | 370/338 |
| 2006/0080462 A1* | 4/2006 | Asnis ...................... | 709/238 |
| 2006/0120288 A1* | 6/2006 | Vasseur et al. .......... | 370/235 |
| 2006/0171320 A1* | 8/2006 | Vasseur et al. .......... | 370/238 |
| 2007/0211722 A1* | 9/2007 | Subramanian | |

* cited by examiner

*Primary Examiner*—Hong Cho
*Assistant Examiner*—Robert C Scheibel
(74) *Attorney, Agent, or Firm*—Cesari and McKenna, LLP

(57) ABSTRACT

In one embodiment, an autoroute filter list may be configured with a list of traffic identifiers. Accordingly, at a tunnel head-end node, an autoroute operation may be performed to configure the routing of all traffic in a network onto an appropriate tunnel except for traffic identified in the autoroute filter list.

25 Claims, 5 Drawing Sheets

ROUTING TABLE 400

| ROUTING FIELD 405 | NEXT-HOP 410 |
|---|---|
| PREFIX_2 | T2 (TUNNEL) |
| PREFIX_1 | NODE C (IP) |
| D2 | NODE C (IP) |
| D1 | T1 (TUNNEL) |
| ⋮ | ⋮ |

ENTRIES 420

SELECTIVELY FORWARDING TRAFFIC THROUGH TUNNELS IN A COMPUTER NETWORK

TECHNICAL FIELD

The present disclosure relates generally to computer networks, and, more particularly, to forwarding traffic through tunnels in the computer network.

BACKGROUND

Many computer networks employ Multi-Protocol Label Switching Traffic Engineering (MPLS-TE) for its strengths, such as fast-reroute, bandwidth guarantees, etc. Often, MPLS-TE establishes tunnels (TE Label Switched Paths, or "TE-LSPs") between nodes (Label Switched Routers, "LSRs") for use with forwarding traffic. When traffic is received at a head-end node (LSR) of a tunnel, that head-end node may encapsulate the traffic within the tunnel to reach a tunnel tail-end node. The tail-end node, if not the destination of the traffic, may decapsulate the traffic, and may forward the traffic on either another tunnel, or through conventional (e.g., Internet Protocol, "IP") routing techniques.

As part of MPLS-TE, an "autoroute" operation may be used by a head-end node in order to route all network traffic down its tunnels. The autoroute operation determines which tunnel could be used for the traffic, and sets up the head-end node's routing tables to route the traffic down the appropriate tunnel. One problem associated with autoroute, however, is that it is not always desirable to send all traffic (at or beyond the tail-end node of a tunnel) onto the tunnels, and conventional autoroute operations offer an "all-or-nothing" approach to forwarding traffic onto tunnels.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 4 illustrates an example routing table; and

DESCRIPTION OF EXAMPLE EMBODIMENTS

Overview

According to embodiments of the disclosure, an autoroute filter list may be configured with a list of traffic identifiers. Accordingly, at a tunnel head-end node, an autoroute operation may be performed to configure the routing of all traffic in a network onto an appropriate tunnel except for traffic identified in the autoroute filter list.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
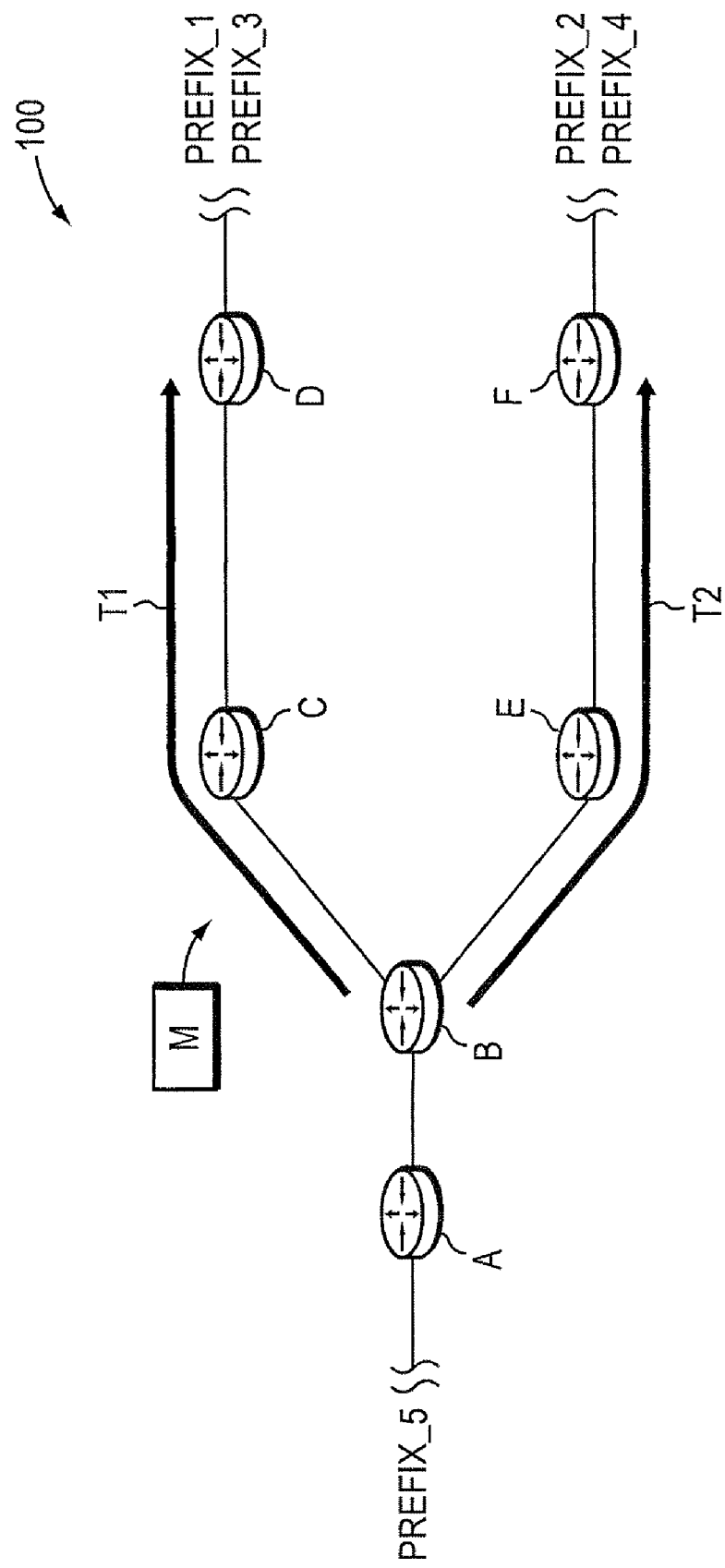
FIG. 1 illustrates an example computer network.

FIG. 1 is a schematic block diagram of portions of an example computer network 100 illustratively comprising nodes/devices, such as nodes A-F interconnected by links as shown. For example, node A may be interconnected with a portion of network 100 having a destination address prefix within "prefix_1" via a path of nodes A-B-C-D, while to reach "prefix_2", a path of nodes A-B-E-F may be used. Also, as described herein, a network management node "M" may be interconnected with one or more of the nodes A-F (links not shown). Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, etc., such as for a customer/provider network configuration.

Data packets (e.g., traffic) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, Multi-Protocol Label Switching (MPLS), etc.

Figure 2:
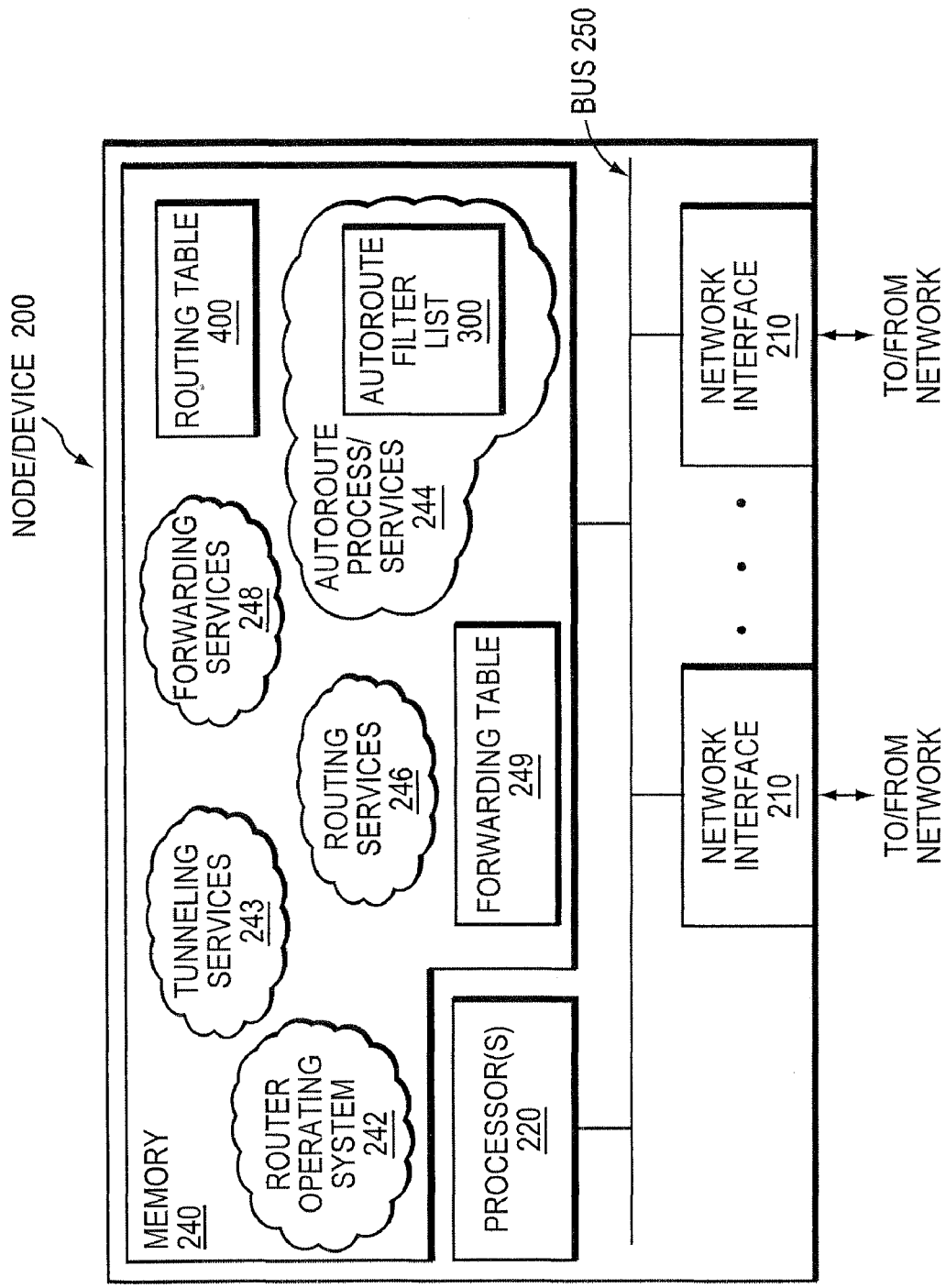
FIG. 2 illustrates an example network device/node.

FIG. 2 is a schematic block diagram of an example node/device 200 that may be advantageously used with one or more embodiments described herein, e.g., as a head-end node (a label switching router, or LSR), node B. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processors 220 may each comprise necessary elements or logic adapted to execute the software programs and manipulate the data structures, such as a routing table 400, forwarding table 249, and an autoroute filter list 300, as described herein. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 246, forwarding process/services 248, tunneling process/services 243, and autoroute process/services 244. It will be apparent to those skilled in the art that other techniques and devices, including various computer-readable media, may be used to store and execute program instructions pertaining to the inventive technique described herein.

Routing services 246 contain computer executable instructions executed by each processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured in conjunction with forwarding process 248 to manage a forwarding information database (table 249) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 246 may also perform functions related to virtual routing protocols, such as maintaining Virtual Routing/Forwarding (VRF) instances (not shown).

Tunneling process/services 243 contain computer executable instructions executed by each processor 220 to perform functions provided by one or more tunneling protocols, such as Multi-Protocol Label Switching (MPLS), which is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (not shown) stores the FEC, the next-hop information for the LSP, and the label required by the next hop.

Also, MPLS Traffic Engineering (TE) has been developed to meet data networking requirements such as guaranteed available bandwidth or fast reroute/restoration (FRR). MPLS TE exploits modern label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Establishment of a tunnel (e.g., TE-LSP) requires computation of a path between a head-end node (LSR) to a tail-end node, signaling along the path (e.g., through RSVP-TE), and modification of forwarding tables at intermediate nodes (LSRs) along the path. Example tunnels are illustrated in FIG. 1 as T1 from head-end node B to tail-end node D, and T2 from head-end node B to tail-end node F. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node (e.g., in a distributed manner, as described herein) or by some other entity operating as a path computation element (PCE) not co-located on the head-end node. Various path computation methodologies are available including CSPF (constrained shortest path first).

In addition, in conjunction with routing services 246 and tunneling services 243, autoroute process/services 244 contain computer executable instructions executed by each processor 220 to perform functions relating to autoroute operations at a head-end node of a tunnel (e.g., node B). In particular, as part of MPLS-TE, an autoroute operation may be used by a head-end node in order to carry all network traffic down its tunnels. The autoroute operation determines which tunnel could be used for the traffic, and sets up the head-end node's routing tables to route the traffic down the appropriate tunnel. Generally, the autoroute functions in a manner such that when routing services 246 performs its routing calculation (e.g., IGP, BGP, etc.), it considers a given node and determines whether the node has a tunnel to that given node. If a tunnel exists, that tunnel is used to reach the node in question and therefore to reach all destination addresses on or behind that given node, including any loopback addresses on the node. As noted above, however, one problem associated with autoroute is that it is not always desirable to send all traffic onto the tunnels. That is, conventional autoroute techniques offer an "all-or-nothing" approach to forwarding traffic onto tunnels, which may not always be optimal in every network situation, such as where an administrator wishes to keep certain traffic off the tunnels, or where it is otherwise beneficial to do so.

Selectively Forwarding Traffic onto Autoroute Tunnels

According to embodiments of the disclosure, an autoroute filter list may be configured with a list of traffic identifiers. Accordingly, at a tunnel head-end node, an autoroute operation may be performed to configure the routing of all traffic in a network onto an appropriate tunnel except for traffic identified in the autoroute filter list.

Illustratively, the techniques described herein may be performed by cooperation between routing services 246, forwarding process 248, tunneling services 243, and autoroute route process 244 on a head-end node (e.g., node B) of the network 100. In particular, the specific delineation of each process/service is merely a representative example of a division of responsibility, and those skilled in the art will appreciate that certain processes/services may be part of a single process/service, or further divided into smaller processes/services, accordingly.

Figure 3:
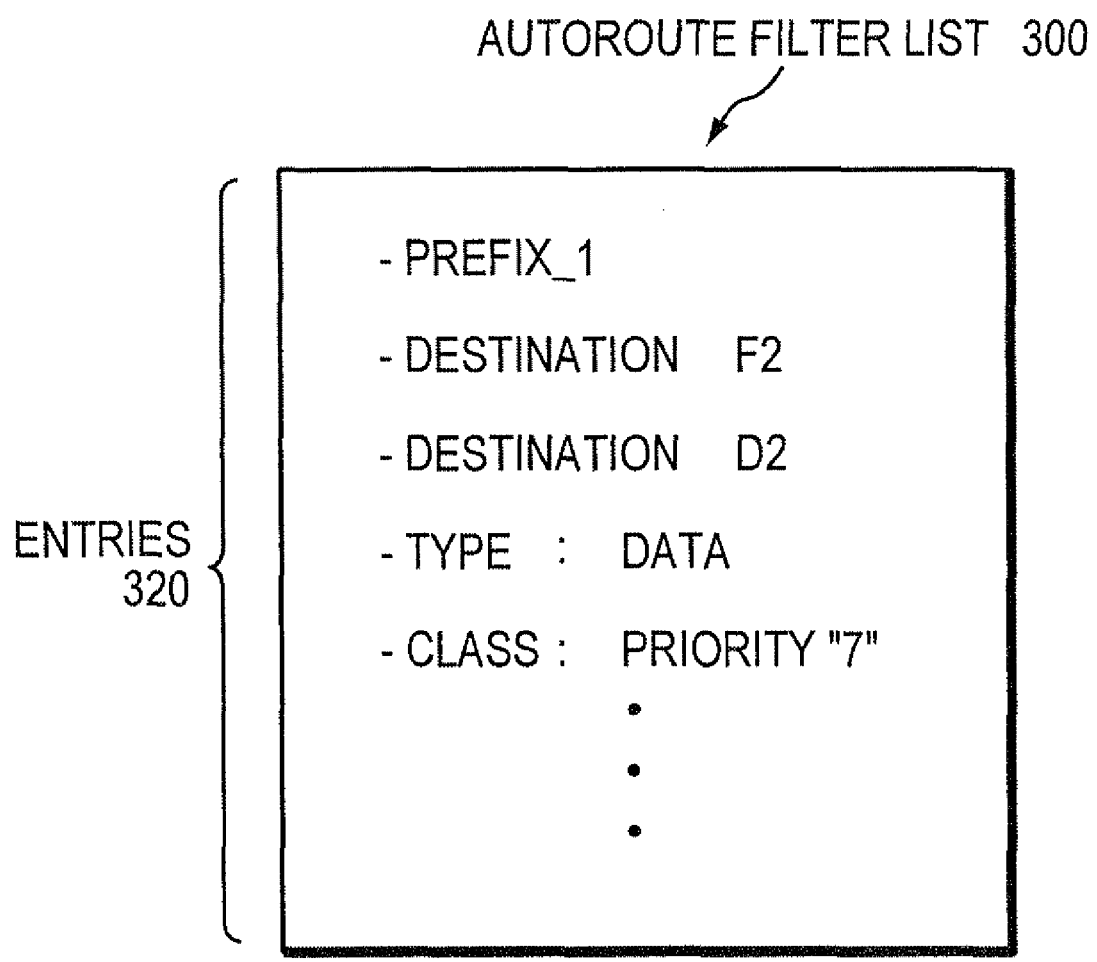
FIG. 3 illustrates an example autoroute filter list.

Operationally, an autoroute filter list may be configured with a list of traffic identifiers, such as based on a field used to make routing decisions by the head-end node. For instance, FIG. 3 illustrates an example autoroute filter list 300 that may be used in accordance with one or more embodiments described herein. Autoroute filter list 300 illustratively includes one or more entries 320, each of which is used for storing the traffic identifiers as described herein. In this manner, the autoroute filter list 300 is a type of access control list (ACL) that offers fine/granular control for traffic separability that is both versatile and protocol independent. The list 300 may be illustratively maintained and managed by autoroute process 244. To that end, the autoroute process 244 maintains the entries 320 of the list 300 in accordance with the configuration techniques described herein. (Notably, the list 300, while shown as a list, may be any other data structure or organization of storage, such as tables, flags, pointers, etc.)

As examples, traffic identifier fields on which the head-end node may base a routing decision may comprise, inter alia, destination addresses (e.g., IP addresses), source addresses, address prefixes, etc. In addition, traffic type, traffic class, route tags, and traffic markings (e.g., DSCP markings, as will be understood) may also be used, depending upon the configuration of the routing table 400 for use by routing services 246, i.e., where the head-end node may utilize such fields to make routing decisions.

The entries 320 of autoroute filter list 300 may be populated by a network administrator on a management node (M) or on the head-end node (B) itself. For example, an administrator may configure selective traffic identifiers that are not to be forwarded on tunnels of the network, and if performed on the management node, may send (advertise/distribute) the autoroute filter list 300 to one or more interested head-end nodes of the network. Conversely, the list 300 may be manually configured on a per-node basis, such that each node may have a different filter list for various purposes, again, either from the management node (and sent to a particular node) or configured at each node individually.

Assume, for instance, that there is a particular set of IP addresses that should not be routed down the tunnels of the network 100, e.g., prefix_1. As such, prefix_1 may be stored in the autoroute filter list 300, and as described herein, may be excluded from being forwarded onto a tunnel (e.g., T1) in the network. Various reasons may exist for a network administrator to exclude certain traffic from tunnels, such as where service providers may offer a differentiated service where only certain traffic is granted access to tunnels in the network.

In addition, traffic identifiers may be defined that keep control traffic and network management traffic off the tunnels (e.g., so if the tunnels were to fail, management traffic may still be able to function). For example, to prevent control/management traffic for nodes of the network 100 from using the tunnels, yet still allowing other traffic (e.g., user data) to reach those nodes, one example option is that a service provider may define/equip each node with first and second loopback destination addresses (e.g., "Loop 1" and "Loop 2"). Illustratively, Loop 1 may be utilized for TE Router Identification (RID), an IGP RID, and a TE tunnel tail-end node RID, while Loop 2 may be utilized for RIDs for LDP and BGP. To prevent one or the other of the Loop 1 or Loop 2 address from having its traffic sent over a tunnel, the Loop 1 or Loop 2 address may be included within the autoroute filter list 300, accordingly. For instance, assume that each node of the network 100 has a Loop 1 address of "A1", "B1", etc., and a Loop 2 address of "A2", "B2", etc. If Loop 2 addresses correspond to network control/management traffic (e.g., LDP, BGP, etc.), then by including Loop 2 addresses (e.g., an entire Loop 2 prefix, or individual addresses, such as F2, D2, etc.), no Loop 2 traffic will be forwarded on tunnels.

Notably, while example traffic identifiers have been shown and described (prefixes, a second destination address of a node, etc.), any separable traffic identification that may be used by the head-end node to make routing decisions may be included within the autoroute filter list 300. For instance, if the ability to route based on traffic type exists in the network 100, then specific types may be excluded from utilizing tunnels, such as forcing data traffic to remain off the tunnels, while other traffic (e.g., voice) may utilize the tunnels for the advantages they present over conventional (e.g. IP) routing. Also, classes of traffic may be used to differentiate traffic within a routing table, and as such, may also be used in list 300, such as priority, flow-based routing identifiers, application-based routing identifiers, etc. In other words, the autoroute filter list 300 offers traffic separability control that meets the ability that routing process 246 (and routing table 400, described below) of the head-end node has to differentiate traffic.

Once the autoroute filter list 300 is configured (e.g., and obtained by the head-end node if not locally configured), the head-end node (e.g., node B) may perform an autoroute operation (autoroute process 244) to configure the routing of all traffic in the network onto an appropriate tunnel except for traffic identified in the autoroute filter list 300. In particular, the autoroute process 244 in accordance with one or more embodiments described herein may generally comprise determining whether particular traffic is identified in the autoroute filter list 300, and whether a destination of the particular traffic is at or beyond a tail-end node of an appropriate tunnel originated by the head-end node. If the traffic is not identified in the list 300 (e.g., prefix_3), and is located at or beyond a tail-end node (that is, the tail-end node is located within a list of hop-by-hop nodes to reach the destination of the traffic), then the head-end node may configure its routing process 246/table 400 to route the traffic over the appropriate tunnel T1 between the head-end node and tail-end node.

Conversely, in response to the traffic being identified in the autoroute filter list 300, or in response to the destination not being at or beyond a tail-end node of an appropriate tunnel, then the head-end node may use a current non-tunneled physical interface (e.g., IP routing) to route the particular traffic. For example, prefix_1 is on the filter list 300, and therefore will not be forwarded over tunnel T1, but rather over a physical interface to next-hop node C (not within the tunnel). Also, prefix_5 is not on the filter list, but is not located at or beyond a tail-end node of a tunnel (originated by the head-end node B), and thus will also be routed over a physical interface to node A.

FIG. 4 illustrates an example routing table 400 that may be used in accordance with one or more embodiments described herein. Routing table 400 illustratively includes one or more entries 420, each comprising a plurality of fields such as, inter alia, one or more routing fields 405 and one or more next-hop fields 410. The routing table 400 may be illustratively maintained and managed by routing process 246. To that end, the routing process 246, in conjunction with the autoroute process 244, maintains the entries of routing table that may be used to make routing decisions on the head-end node.

In particular, based on the autoroute operation (process 246) above, the entries 420 of the routing table 400 may be appropriately configured in accordance with the autoroute filter list 300. That is, the autoroute operation may be executed to establish/configure the routing table 400, and then the routing table may be used without re-executing the autoroute process upon receiving traffic. For example, based on the autoroute operation above, assume that the routing field of entry 420 contains prefix_2, which is not on the filter list 300 and is beyond a tail-end node (F) of a tunnel (T2). Accordingly, the next-hop field 410 associated with prefix_2 indicates forwarding onto the appropriate tunnel, T2. (Those skilled in the art will appreciate that routing table 400 is a simplified example, and is merely representative for ease of description herein.) On the other hand, prefix_1 is located on the autoroute filter list 300, and thus would be inserted into the routing table 400 with a next-hop entry of the non-tunneled next-hop node C. As further examples, in a manner as described above, traffic for destination address D1, which is a tail-end node, may be forwarded over the tunnel T1, while address D2, the same tail-end node, may be forwarded to the non-tunneled next-hop node C, since D2 is located within the example autoroute filter list 300 above.

Illustratively, the routing table 400 may be used to configure the forwarding of traffic (forwarding table 249), such that when traffic is received by the head-end node, the traffic may be forwarded based on the forwarding configuration (table 249). For instance, as will be appreciated by those skilled in the art, the routing entries of routing table 400 may be further distilled to a forwarding table 249 (e.g., by forwarding process), which illustratively represents hardware-level forwarding (e.g., a particular port of the node with a particular label, etc.). In this manner, the traffic separation defined and utilized by the autoroute process 244 (control plane) is propagated into both the routing and forwarding tables (forwarding plane), and thus only requires a single forwarding lookup (to forwarding table 249) upon receiving traffic to forward the traffic in a manner consistent with the autoroute filter list 300, without having to re-reference the list.

Figure 5:
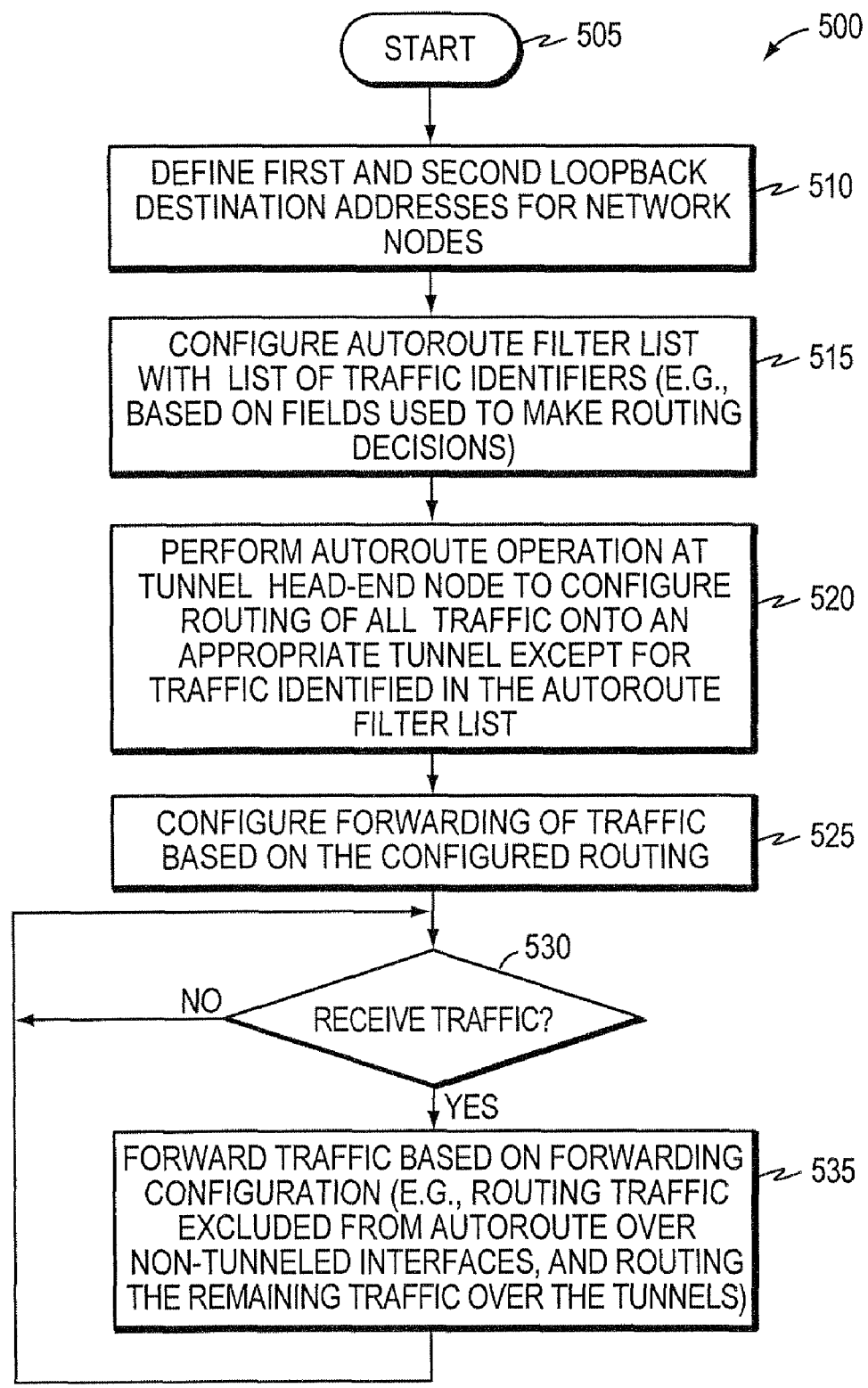
FIG. 5 illustrates an example procedure for selectively forwarding traffic onto autoroute tunnels.

FIG. 5 illustrates an example procedure for selectively forwarding traffic onto autoroute tunnels in accordance with one or more embodiments described herein. The procedure 500 starts at step 505, and continues to step 510, where the network may be initialized by defining first and second loopback destination addresses for network nodes, e.g., D1 and D2, F1 and F2, etc. In step 515, an autoroute filter list 300 may be configured with list of traffic identifiers as described above. For example, the identifiers may be based on fields used to make routing decisions, such as excluding the second loopback destination addresses, certain prefixes, etc. Also, the list 300 may be configured at the head-end node (e.g., B) or at a network management node (e.g., M) to be transmitted to the head-end node. Once the autoroute filter list 300 is obtained, the head-end node may perform an autoroute operation in step 520 to configure routing (e.g., routing table 400) of all traffic onto an appropriate tunnel except for traffic identified in the autoroute filter list, as described above.

Based on the configured routing (e.g., routing table 400), the forwarding of traffic (e.g., forwarding table 249) may be configured in step 525 in a conventional manner, such that upon receiving traffic in step 530, the head-end node may forward traffic accordingly in step 535. For instance, without requiring additional lookup operations beyond conventional forwarding, the head-end node may route traffic excluded from autoroute over non-tunneled interfaces, and may route the remaining traffic over the tunnels, as described above. In this manner, the techniques described herein allow for selective traffic forwarding over tunnels using autoroute. (Notably, the procedure 500 may return to step 530 to receive further traffic, or, as necessary, may return to any appropriate step above, such as 510 to change loopback addresses or 515 to re-configure the autoroute filter list, etc.)

Advantageously, the novel techniques described herein selectively forward traffic onto autoroute tunnels in a computer network. By utilizing an autoroute filter list, the novel techniques allow for scalable control over which traffic (prefixes) are forwarded down an autorouted tunnel. In particular, the techniques described above allow for this control without modification to forwarding plane hardware or software, and is contained within the control plane. Further, the techniques described above offer advantages over other more complicated techniques (e.g., multi-topology routing or "MTR", etc.), and also requires no changes to various network/signaling protocols.

While there have been shown and described illustrative embodiments that selectively forward traffic onto autoroute tunnels in a computer network, it is to be understood that various other adaptations and modifications may be made within the spirit and scope of the present invention. For example, the embodiments have been shown and described herein for use with MPLS TE tunnels. However, the embodiments of the invention in their broader sense are not so limited, and may, in fact, be used with any tunneling protocol suitable for use with autoroute operations, such as the layer two tunneling protocol (L2TP), the Point-to-Point Tunneling Protocol (PPTP), IP tunnels, etc. Also, while the above description mentions an autoroute operation, the techniques are not limited to any particular standardized autoroute operation, and may be used with any operation that selects traffic to be sent over a tunnel, while excluding other traffic from being sent over a tunnel.

Moreover, while the embodiments described above reference the autoroute filter list 300 as an exclusion list, where traffic identifiers that are within the list are to be excluded from autoroute operations, the techniques herein may be equally applicable to inclusion lists. For instance, rather than filtering traffic identifiers to specifically exclude from being autorouted onto a tunnel, one or more embodiments may use the autoroute filter list 300 to designate which traffic identifiers are to be specifically included during an autoroute operation (e.g., excluding traffic not in the filter list).

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
defining first and second loopback destination addresses for one or more nodes of a network;
configuring an autoroute filter list with a list of traffic identifiers;
configuring the autoroute filter list to include one of the first and second loopback destination addresses for each node; and
performing an autoroute operation at a tunnel head-end node to configure routing of traffic in the network onto one or more tunnels except for traffic identified in the autoroute filter list.

2. The method as in claim 1, further comprising:
utilizing the first loopback destination address for at least one of a Traffic Engineering (TE) Router Identification (RID), an Interior Gateway Protocol (IGP) RID, and a TE tunnel tail-end node RID.

3. The method as in claim 1, further comprising:
utilizing the second loopback destination address for at least one of a Label Distribution Protocol (LDP) Router Identification (RID) and a Border Gateway Protocol (BGP) RID.

4. The method as in claim 3, further comprising:
including the second loopback destination address in the autoroute filter list of each node.

5. The method as in claim 1, further comprising:
routing traffic excluded from autoroute over non-tunneled Internet Protocol (IP) interfaces.

6. The method as in claim 1, further comprising:
configuring forwarding of the traffic based on the configured routing.

7. The method as in claim 6, further comprising:
receiving traffic at the tunnel head-end node; and
forwarding the traffic based on the forwarding configuration.

8. The method as in claim 1, further comprising:
including network control traffic and network management traffic within the autoroute filter list.

9. The method as in claim 1, further comprising:
configuring the autoroute filter list at a management node of the network; and
receiving the autoroute filter list at the tunnel head-end node.

10. The method as in claim 1, further comprising:
configuring the autoroute filter list at the tunnel head-end node.

11. An apparatus, comprising:
one or more network interfaces to act as a head-end interface for one or more tunnels in a network
one or more processors coupled to the network interfaces and to execute one or more processes; and
a memory to store an autoroute process executable by each processor, the autoroute process when executed operable to: obtain an autoroute filter list with a list of traffic identifiers, the autoroute filter list to include one of a first and a second loopback destination address for a node in the network, and perform an autoroute operation to configure routing of traffic in the network onto one or more tunnels except for traffic identified in the autoroute filter list, such that traffic directed to the one of the first and the second loopback destination address for the node that is included in the autoroute filter list is not routed onto the one or more tunnels.

12. The apparatus as in claim 11, wherein the autoroute process when executed is further operable to: in response to particular traffic having a destination that is at or beyond a tail-end node of a particular tunnel and is not identified in the autoroute filter list, configure the routing to route the particular traffic to the destination over the particular tunnel.

13. The apparatus as in claim 11, wherein the autoroute process when executed is further operable to: in response to particular traffic having a destination that is at or beyond a tail-end node of a particular tunnel and is identified in the autoroute filter list, use a current non-tunneled physical interface to route the particular traffic.

14. The apparatus as in claim 11, wherein the first loopback destination address is associated with at least one of traffic for Traffic Engineering (TE) Router Identification (RID), an Interior Gateway Protocol (IGP) RID, and a TE tunnel tail-end node RID.

15. The apparatus as in claim 11, wherein the autoroute process when executed is further operable to: route traffic not routed onto the one or more tunnels over non-tunneled Internet Protocol (IP) interfaces.

16. An apparatus, comprising:
one or more network interfaces to act as a head-end interface for one or more tunnels in a network;
means for obtaining an autoroute filter list, the autoroute filter list to include one of a first and a second loopback destination address for a node in the network,
means of performing an autoroute operation to configure routing of traffic identified in the autoroute filter list onto one or more tunnels in the network while excluding traffic not being identified in the autoroute filter list from the one or more tunnels, such that traffic directed to the one of the first and the second loopback destination address for the node not included in the autoroute filter list is not routed onto the one or more tunnels.

17. The apparatus as in claim 16, further comprising:
means for routing traffic not routed onto the one or more tunnels over non-tunneled Internet Protocol (IP) interfaces.

18. The apparatus as in claim 16, wherein the first loopback destination address is associated with at least one of traffic for Traffic Engineering (TE) Router Identification (RID), an Interior Gateway Protocol (IGP) RID, and a TE tunnel tail-end node RID.

19. A method, comprising:
maintaining, by a tunnel head-end node, one or more tunnels in a network;
obtaining an autoroute filter list, the autoroute filter list to include one of a first and a second loopback destination address for a node in the network accessible via the one or more tunnels; and
performing an autoroute operation based on the autoroute filter list to configure routing of traffic directed to the first loopback destination address for the node to be over the one or more tunnels and to exclude traffic directed to the second loopback destination address for the node from being over the one or more tunnels.

20. The method as in claim 19, further comprising:
routing traffic directed to the second loopback destination address for the node over one or more non-tunneled Internet Protocol (IP) interfaces.

21. The method as in claim 19, wherein the first loopback destination address is associated with at least one of traffic for Traffic Engineering (TE) Router Identification (RID), Interior Gateway Protocol (IGP) RID, and TE tunnel tail-end node RID.

22. The method as in claim 19, wherein the second loopback destination address is associated with at least one of traffic for Label Distribution Protocol (LDP) Router Identification (RID) and Border Gateway Protocol (BGP) RID.

23. The method as in claim 19, further comprising:
configuring the autoroute filter list at the tunnel head-end node.

24. The method as in claim 19, further comprising:
receiving the autoroute filter list at the tunnel head-end node from a separate management node in the network.

25. The method as in claim 19, wherein the autoroute filter list further includes at least one identifier selected from a group consisting of a source address, address prefix, traffic type, traffic class, route tag, and traffic marking, used to make routing decisions when routing packets to the node.

* * * * *

UNITED STATES PATENT AND TRADEMARK OFFICE
CERTIFICATE OF CORRECTION

| | |
|---|---|
| PATENT NO. | : 7,843,918 B2 |
| APPLICATION NO. | : 12/019692 |
| DATED | : November 30, 2010 |
| INVENTOR(S) | : Eric W. Osborne |

It is certified that error appears in the above-identified patent and that said Letters Patent is hereby corrected as shown below:

Col. 5, Line 16, remove "route"

Signed and Sealed this
Seventeenth Day of May, 2011

David J. Kappos
*Director of the United States Patent and Trademark Office*